United States Patent
Hung et al.

(10) Patent No.: US 7,151,529 B2
(45) Date of Patent: Dec. 19, 2006

(54) INPUT APPARATUS FOR HAND-HELD ELECTRONIC DEVICES AND COMPUTERS

(75) Inventors: Ming-Wei Hung, Taipei (TW);
Huan-Jung Lin, Changhua (TW)

(73) Assignee: Darfon Electronics Corp., Taoyuan (TW)

( * ) Notice: Subject to any disclaimer, the term of this patent is extended or adjusted under 35 U.S.C. 154(b) by 1017 days.

(21) Appl. No.: 10/226,585

(22) Filed: Aug. 23, 2002

(65) Prior Publication Data
US 2003/0095288 A1 May 22, 2003

(30) Foreign Application Priority Data
Nov. 22, 2001 (TW) .............................. 90128921 A

(51) Int. Cl.
*G09G 5/00* (2006.01)
(52) U.S. Cl. ...................................... 345/168; 345/156
(58) Field of Classification Search ................ 345/156, 345/168, 169
See application file for complete search history.

(56) References Cited

U.S. PATENT DOCUMENTS

| | | | | |
|---|---|---|---|---|
| 6,154,745 A * | 11/2000 | Kari et al. | .................. | 707/100 |
| 6,754,895 B1 * | 6/2004 | Bartel et al. | ................. | 717/171 |
| 6,795,304 B1 * | 9/2004 | Lam | ........................... | 361/683 |
| 2002/0194468 A1 * | 12/2002 | Betts-LaCroix et al. | .... | 713/100 |

* cited by examiner

*Primary Examiner*—Ricardo Osorio
(74) *Attorney, Agent, or Firm*—Ladas & Parry LLP

(57) ABSTRACT

An input apparatus for a hand-held electronic device and a computer. The universal input apparatus includes a main connection port, a communication port, an input controller, a communication controller and a route selection unit. The main connection port connects to the hand-held electronic device and the communication port connects to the computer. The input controller provides a plurality of serial input signals. The communication controller, having a serial port coupled to the communication port, is configured to convert the serial input signals into a pair of differential signals transferred through the serial port. Further, the route selection unit establishes a first route between the input controller and the main connection port and establishes a second route between the input controller and the communication controller. Therefore, the serial input signals can be transferred over the first route or the second route alternatively.

23 Claims, 6 Drawing Sheets

INPUT APPARATUS FOR HAND-HELD ELECTRONIC DEVICES AND COMPUTERS

FIELD OF THE INVENTION

The present invention relates generally to an input apparatus for hand-held electronic devices and computers and, in particular, to a portable keyboard for data entry which fits directly on a hand-held electronic device and a computer and provides recharging of the hand-held electronic device and synchronization of the hand-held electronic device with the computer.

BACKGROUND OF THE INVENTION

Recently, personal digital assistants (PDA) or other hand-held devices that combines computer, communication and consumer electronics technologies are becoming very popular because of their advantageous features including ability to write notes, record names, addresses and phone numbers, and to develop an appointment calendar. In the example of FIG. 1A, a hand-held electronic device 100, such as PDA, is typically mounted on a cradle 110 connected to a desktop or notebook computer 150 through a cable 120. In this manner, the hand-held electronic device 100 can synchronize and backup data with the computer 150. In addition, the cradle 110 works with an AC adapter 170 to recharge the hand-held electronic device 100 if the hand-held device 100 is nearly out of charge. To type accurately and improve productivity, on the other hand, a conventional portable keyboard 130 is attached to the hand-held electronic device 100, as shown in FIG. 1B, for quickly entering large amounts of data.

A hand-held electronic device attracts users due to its pocket size which allows easy transport. However, because it is compact, it requires the user to carry along the cradle and the portable keyboard to perform key entry, synchronize data as well as charge the hand-held device in any occasion, hence reducing the convenience of the hand-held electronic device and discouraging consumers from buying it. Apart from the above inconvenience, the conventional portable keyboard for the hand-held electronic device can not fit directly onto a desktop or notebook computer. Hence, it is awkward for a user to prepare an extra keyboard for computer use even though a portable keyboard for the hand-held device may already be owned.

Accordingly, what is needed is an input apparatus for a hand-held electronic device and a computer, unencumbered by the limitations associated with the prior art.

SUMMARY OF THE INVENTION

It is an object of the present invention to provide a universal input apparatus for a hand-held electronic device and a computer to perform data entry.

It is another object of the present invention to provide a portable keyboard attaching to a hand-held electronic device and a computer for data entry and, particularly, providing data synchronization and battery charging functions.

The present invention is generally directed to a universal input apparatus for a hand-held electronic device and a computer. According to one aspect of the invention, the input apparatus includes a main connection port, a communication port, an input controller, a communication controller and a route selection unit. The main connection port, having a first port and a second port, is adapted to connect to the hand-held electronic device. The communication port is adapted to connect to the computer. The input controller is used to provide a plurality of serial input signals. The communication controller includes a first serial port coupled to the second port of the main connection port and a second serial port coupled to the communication port. The communication controller is provided for receiving and converting the serial input signals into a pair of differential signals transferred through the second serial port. Moreover, the communication controller synchronizes the hand-held electronic device with the computer in response to a sync enable signal in which data is sent/received through the first serial port by way of the second port to/from the hand-held electronic device and through the second serial port by way of the communication port to/from the computer. The route selection unit establishes a first route between the input controller and the main connection port, and establishes a second route between the input controller and the communication controller. Therefore, the serial input signals are transferred over the first route and the second route alternatively.

When the route selection unit establishes the first route between the input controller and the first port of the main connection port, the input controller sends the serial input signals to the hand-held electronic device over the first route through the first port. Alternatively, when the route selection unit establishes the second route between the input controller and the communication controller, the communication controller converts the serial input signals, received from the second route, into the pair of differential signals compliant with the USB specification and then transfers the pair of differential signals to the computer through the communication port.

The universal input apparatus also includes a sync button, a power port and a PS/2 port. The sync button provides the sync enable signal to the communication controller causing data synchronization between the handheld electronic device and the computer. The power port is adapted to connect to an external power source which provides recharging of the hand-held electronic device through the second port of the main connection port. In addition, when the route selection unit establishes the second route, the PS/2 port is used to pass the serial input signals to the computer.

According to another aspect of the invention, an input apparatus attached to an electronic device and a computer is provided for data entry. The input apparatus has a user control interface. Preferably, the input apparatus of the invention is a keyboard and the user control interface is a keypad. The inventive input apparatus includes a main connection port, a communication port, an input controller, a communication controller and a route selection unit. The main connection port having a first port is provided for attaching the electronic device. On the other hand, the communication port is provided for connecting to the computer. The input controller may be a keyboard controller. When the user control interface is operated, i.e., the keypad is pressed, the input controller generates a user-input signal. The communication controller has an upstream port coupled to the communication port. According to the invention, the communication controller is preferably a USB controller. There are first and second routes in the input apparatus. The first route is electrically coupled between the input controller and the first port, and the second route is electrically coupled between the input controller and the communication controller. Furthermore, the route selection unit transfers the user-input signal over the first route and the second route alternatively. When the route selection unit selects the first route, the userinput signal is transferred through the first route to the first port. When the route selection unit selects the second route, the user-input signal is transferred through the second route to the communication controller so as to output a corresponding transmission signal to the communication port.

The inventive input apparatus further includes a sync button, the main connection port further includes a second port, and the communication controller further includes a downstream port coupled to the second port. When the sync button is triggered, the communication controller stops outputting the transmission signal and causes data transfer between the upstream port and the downstream port, thereby providing synchronization of the electronic device with the computer.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT

Figure 1B:
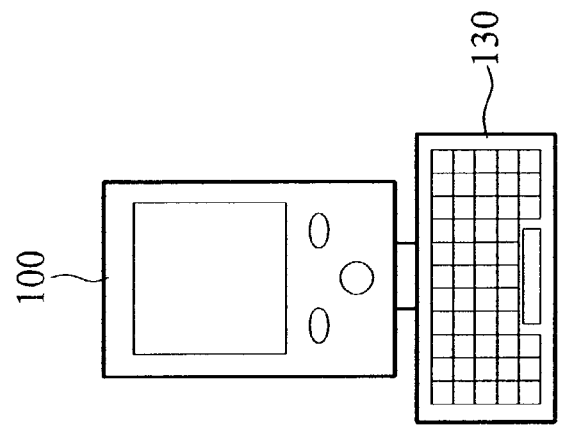
FIG. 1B is a conceptual diagram of a conventional portable keyboard attached to the hand-held electronic device to input data to the device.
Figure 1A:
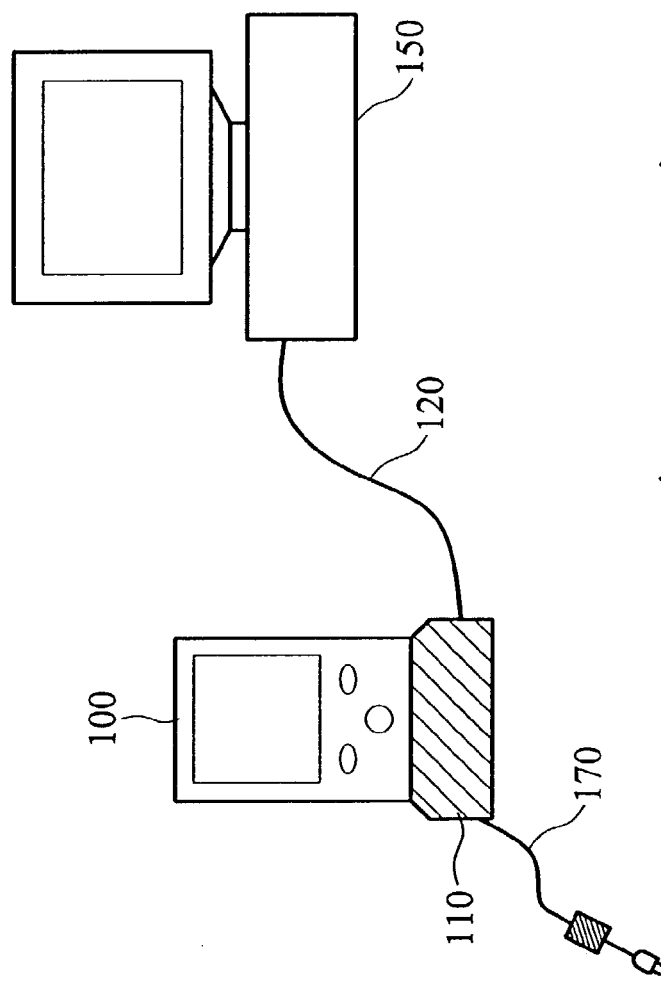
FIG. 1A is a conceptual diagram of a hand-held electronic device combined with a conventional cradle to synchronize data with a computer.
Figure 2:
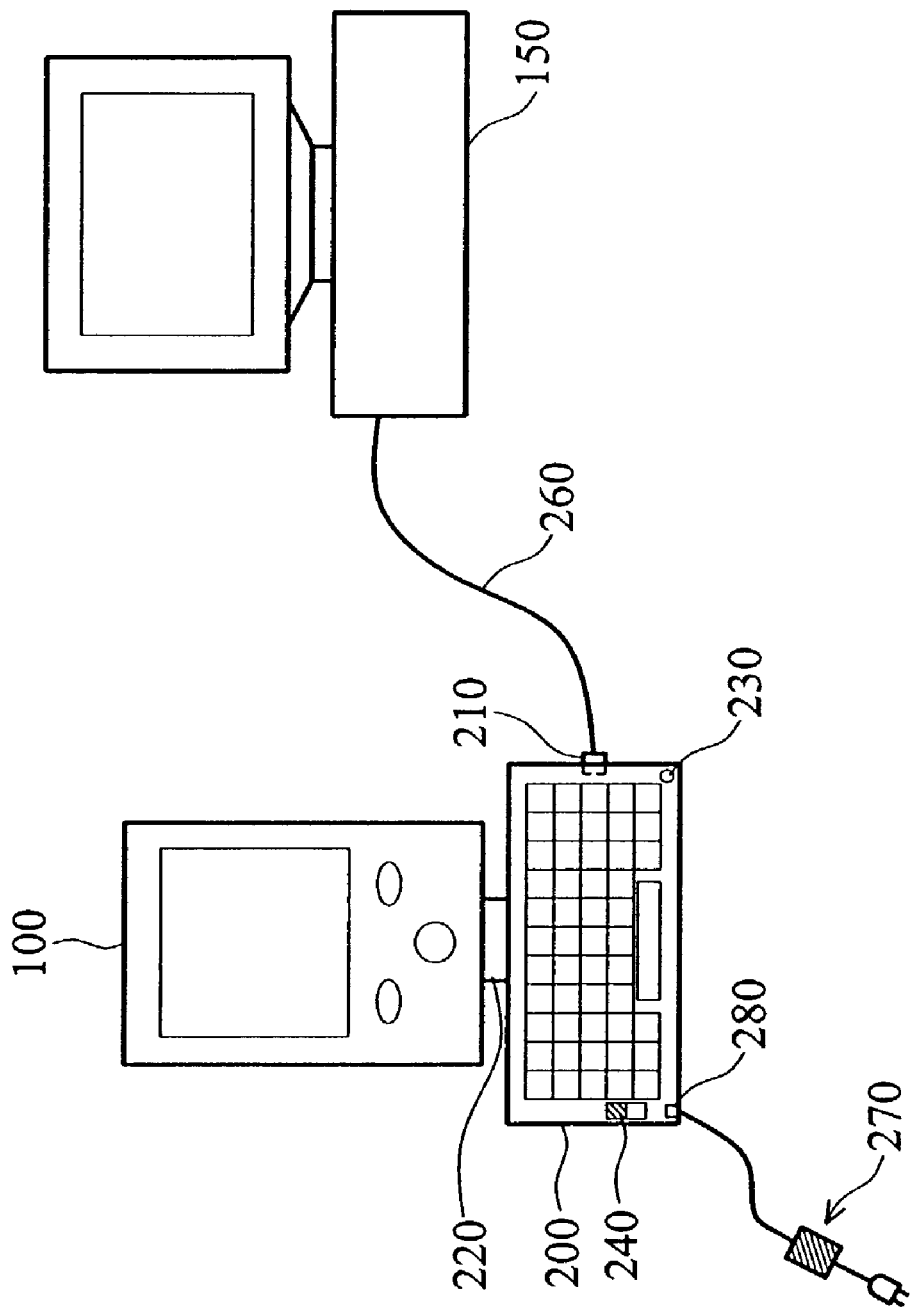
FIG. 2 is a conceptual diagram of a preferred embodiment according to the invention.

According to the invention, data entry, synchronization and battery charging functions are integrated in a universal input apparatus. Referring to FIG. 2, a universal input apparatus 200, such as a portable keyboard for a hand-held electronic device, has a main connection port 220 and a communication port 210. The portable keyboard 200 is attached to a hand-held electronic device 100 through the main connection port 220 and connected to a computer 150 through the communication port 210 and a cable 260. Preferably, the communication port 210 is compliant with the USB specification. To reduce the height of the portable keyboard 200, the USB port 210 is physically a mini USB female connector. The cable 260 has USB plugs in its two ends. One end connects the computer 150, and is a typical USB plug. However, to match the USB port 210, the other cable end is a mini USB plug.

A switch 240 is used to selectively attach the portable keyboard 200 to the hand-held electronic device 100 or the computer 150 for data entry. The portable keyboard 200 also includes a sync button 230. Once the sync button 230 is pushed, the portable keyboard 200 synchronizes data in the hand-held electronic device 100 with the computer 150. It is appreciated to those skilled in the art that the hand-held electronic device 100 and the computer 150 must have operating systems or drivers supporting USB devices, further, application software relative to the synchronization must be installed on the hand-held device 100 to synchronize and backup data with the computer 150.

Still referring to FIG. 2, if the computer 150 is powered on, the portable keyboard 200 can source electric energy from the computer 150 to charge the hand-held electronic device 100. Otherwise, if the computer 150 is turned off or it is not connected to the portable keyboard 200, an AC adapter 270 can be plugged into a power port 280 to provide power. The portable keyboard 200 can source electric energy from the AC adapter 270 to charge the hand-held electronic device 100, whether it is connected to the computer 150 or not.

Figure 3A:
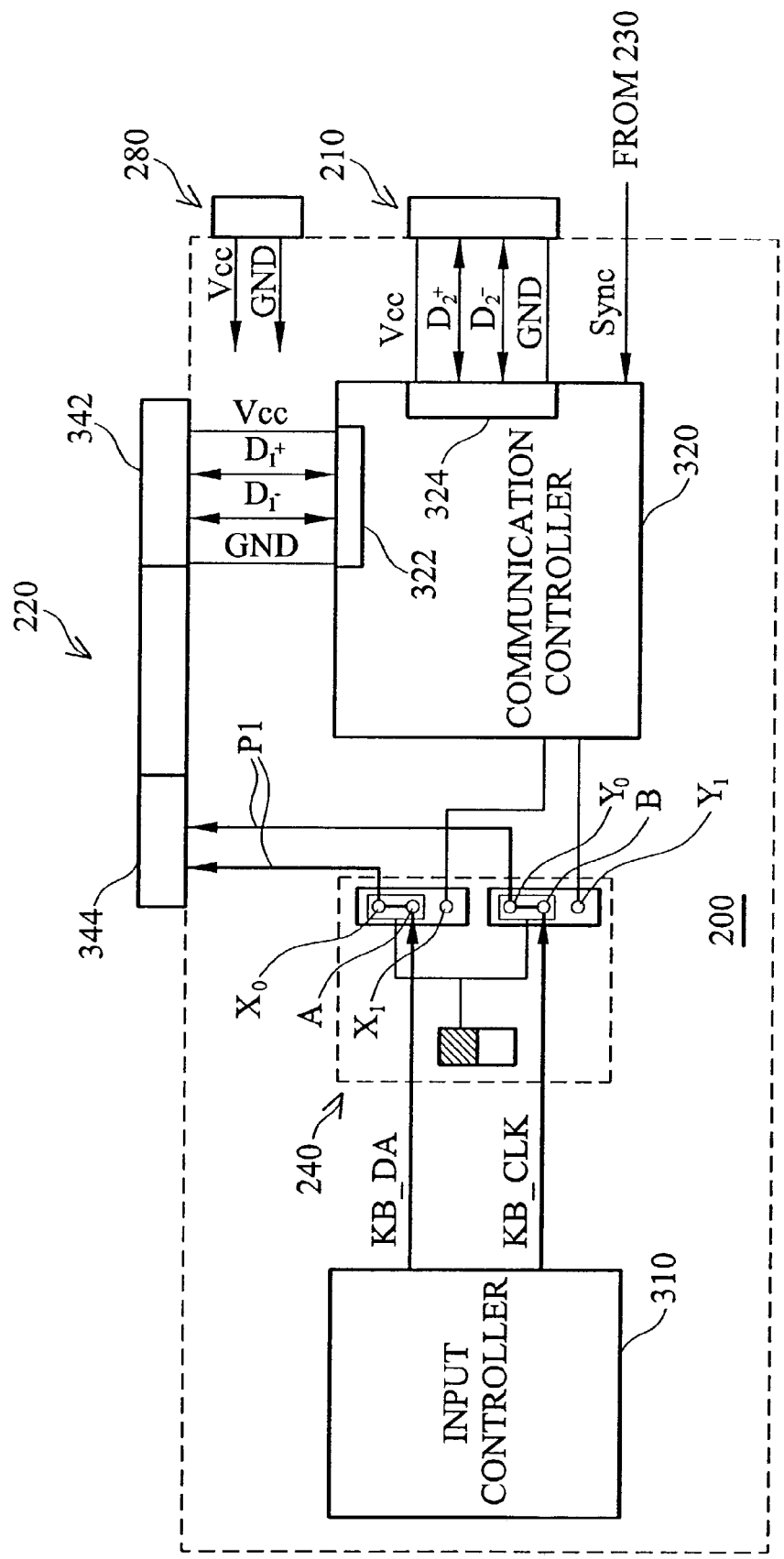
FIG. 3A is a schematic diagram illustrating a universal input apparatus and a first route therein according to the invention.

FIG. 3A is a schematic diagram of a preferred embodiment according to the invention. The main connection port 220, including a first port 344 and a second port 342, is adapted to attach to the hand-held electronic device 100. The USB port 210 is adapted to connect to the computer 150. In one embodiment, an input controller 310 may be a keyboard controller provided for processing input signals relating to the keys pressed by a user. Therefore, the input controller 310 generates a plurality of serial input signals including a data signal KB_DA and a clock signal KB_CLK. A communication controller 320 has a first serial port 322 coupled to the second port 342 and has a second serial port 324 coupled to the USB port 210. In one embodiment, the communication controller 320 is a USB controller supporting USB hub function in which the first serial port 322 is a downstream port and the second serial port 324 is an upstream port. The downstream port 322 is used to send/receive a pair of USB differential signals $D_1+$ and $D_1-$, and the upstream port 324 is used to send/receive a pair of USB differential signals $D_2+$ and $D_2-$. Also, the upstream and downstream ports 324 and 322 include power and ground lines Vcc, GND.

The communication controller 320 is provided for receiving and converting the signals KB_DA and KB_CLK into the pair of differential signals $D_2+$ and $D_2-$ transferred through the second serial port 324. Moreover, the communication controller 320 synchronizes the hand-held electronic device 100 with the computer 150 in response to a sync enable signal Sync. Note that data is sent/received through the downstream port 322 by way of the second port 342 to/from the hand-held electronic device 100 and through the upstream port 324 by way of the USB port 210 to/from the computer 150. There is a sync button 230 for providing the sync enable signal Sync.

Figure 3B:
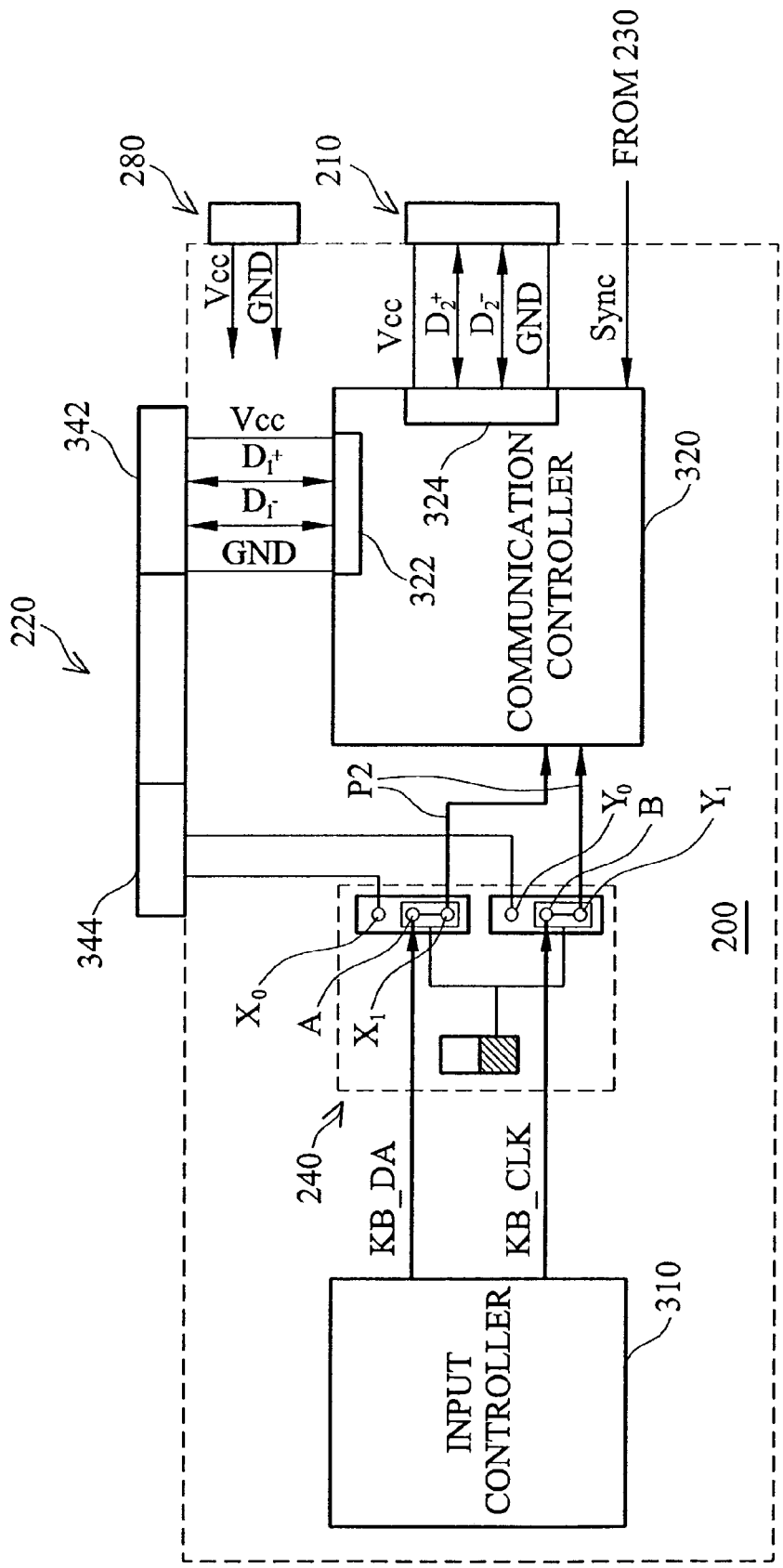
FIG. 3B is schematic diagram illustrating the universal input apparatus of FIG. 3A and a second route therein according to the invention.

In the case of FIGS. 3A and 3B, the switch 240 is a mechanical route selection unit for establishing a first route P1 and a second route P2 alternatively. The first route P1 is established between the input controller 310 and the first port 344 of the main connection port 220, and the second route P2 is established between the input controller 310 and the USB controller 320. This allows the data signal KB_DA and the clock signal KB_CLK to be transferred through the first port 344 to the hand-held device 100 over the first route P1, or to be transferred by way of the USB controller 320 to the computer 150 over the second route P2.

Further, the switch 240 is set at a first state to selectively establish the first route P1 between the keyboard controller 310 and the first port 344 of the main connection port 220 as depicted in FIG. 3A. This causes poles A and $X_0$ of the switch 240 to short-circuit, and also causes poles B and $Y_0$ of the switch 240 to short-circuit. As a result, the first route P1 is established, and thus the signals KB_DA and KB_CLK can be sent from the keyboard controller 310 through the first port 344 to the hand-held device 100. On the other hand, the switch 240 is set at a second state to selectively establish the second route P2 between the keyboard controller 310 and the USB controller 320 as depicted in FIG. 3B. This causes poles A and $X_1$ of the switch 240 to short-circuit, and also causes poles B and $Y_1$ of the switch 240 to short-circuit. Therefore, the second route P2 is established, and the signals KB_DA and KB_CLK can be sent from the keyboard controller 310 to the USB controller 320. The USB controller receives and converts the signals KB_DA, KB_CLK into the USB differential signals $D_2+$ and $D_2-$, and then sends them to the computer 150 through the USB port 210.

Figure 4A:
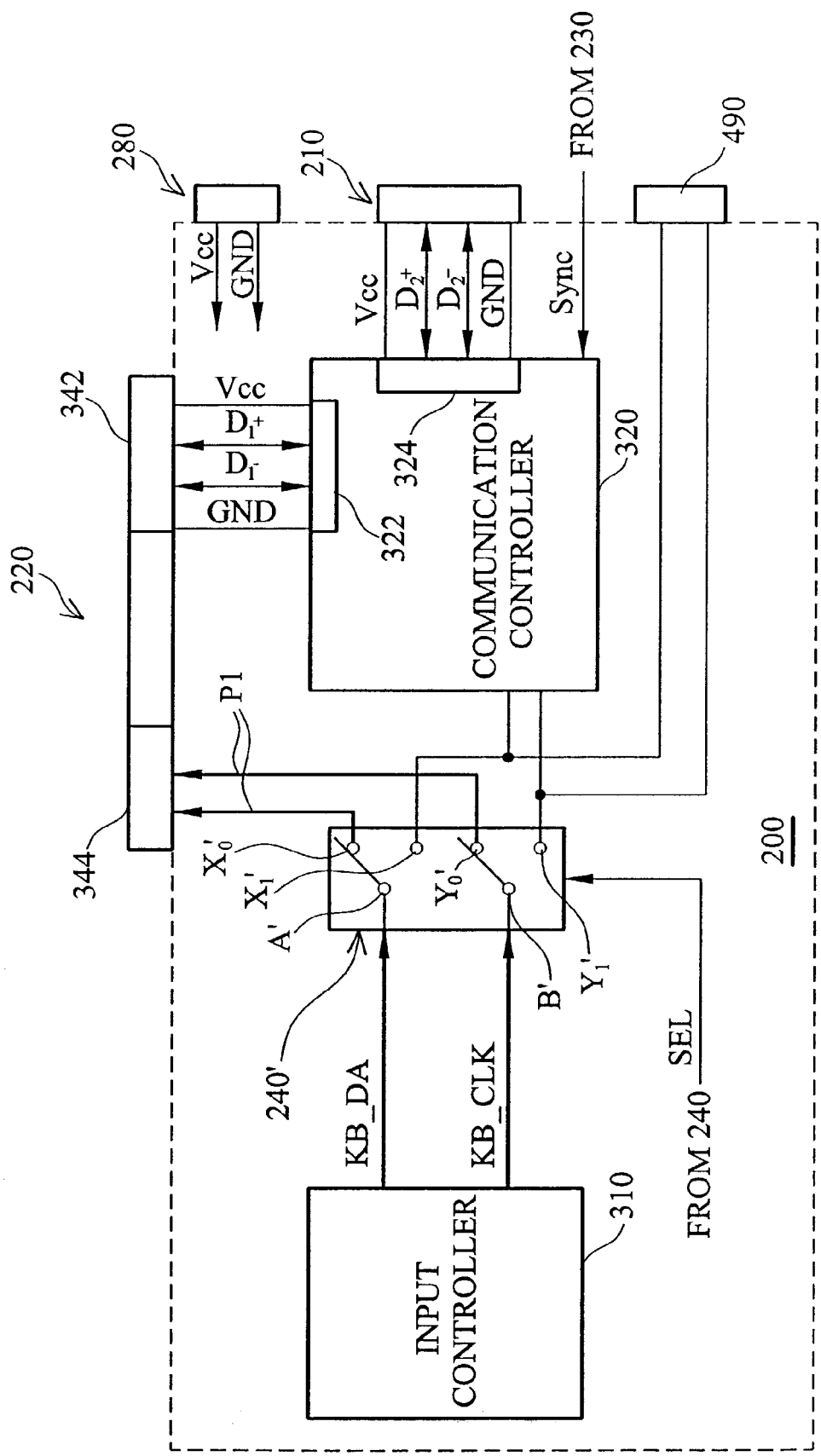
FIG. 4A is schematic diagram illustrating an alternative embodiment and a first route therein according to the invention.
Figure 4B:
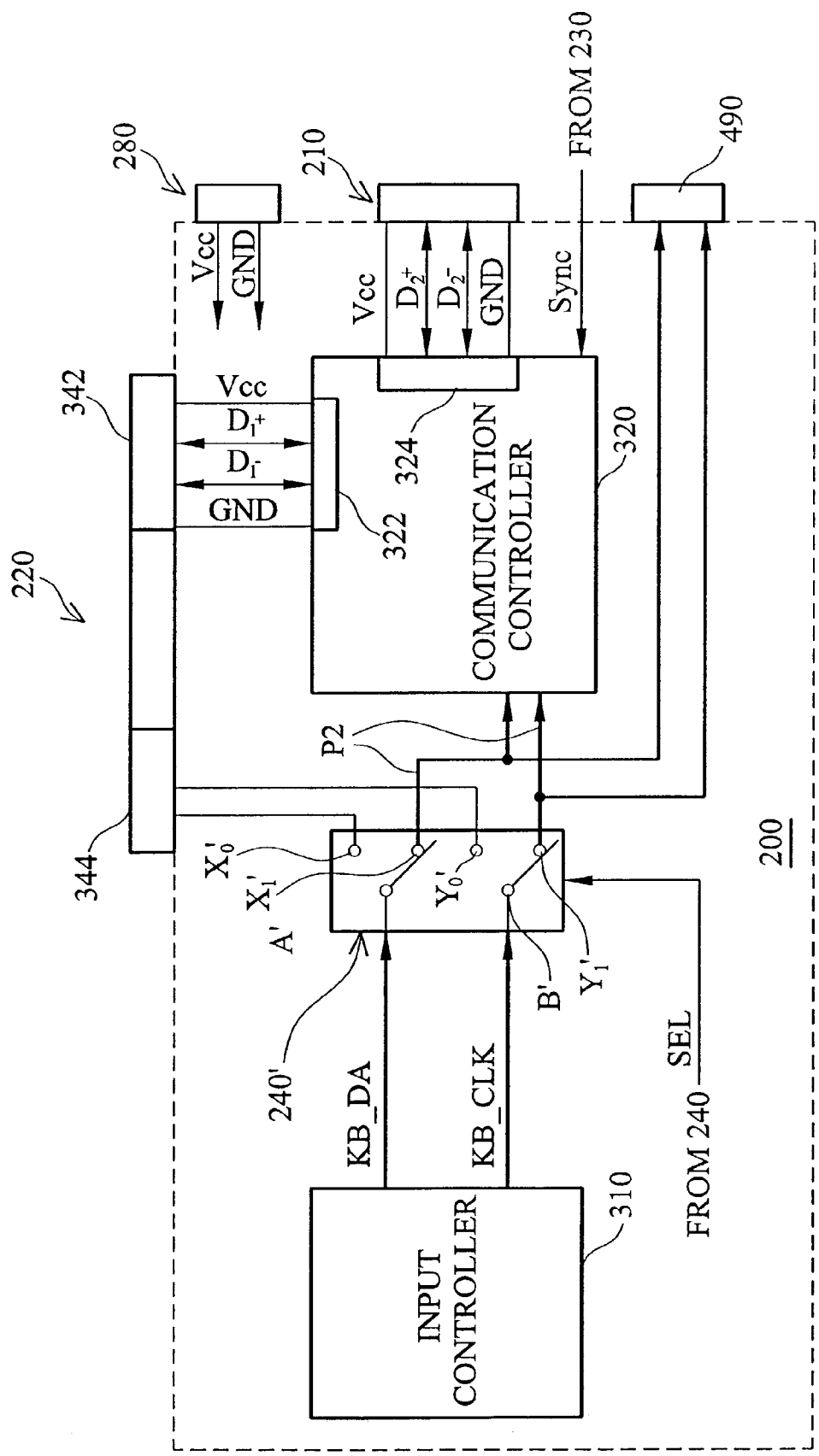
FIG. 4B is schematic diagram illustrating the alternative embodiment of FIG. 4A and a second route therein according to the invention.

In an alternative embodiment, the route selection unit is an electronic switch selectively establishing the first route and the second route in accordance with a select signal. Referring to FIG. 4A, an external switch 240 of the portable keyboard 200 is set at a first state to generate the select signal SEL being logic "0", so the first route Pi between the keyboard controller 310 and the first port 344 of the main connection port 220 is selected. In response to the signal SEL at logic "0", the electronic switch 240' connects its terminals A' and $X_0'$, and connects its terminals B' and $Y_0'$. This allows the first route P1 to be established, whereby the signals KB_DA and KB_CLK can be sent from the keyboard controller 310 through the first port 344 to the hand-held device 100. On the other hand, the external switch 240 is set at a second state to generate the select signal SEL as logic "1", so the second route P2 between the keyboard controller 310 and the USB controller 320 is selected as depicted in FIG. 4B. In response to the signal SEL at logic "1", the electronic switch 240' makes its terminals A' and $X_1'$ connected, and makes its terminals B' and $Y_1'$ connected. Additionally, the electronic switch 240' breaks the connection between terminals A' and $X_0'$ and the connection between terminals B' and $Y_0'$. This allows the second route P2 to be established, whereby the signals KB_DA and KB_CLK can be sent from the keyboard controller 310 to the USB controller 320. The USB controller receives and converts the signals KB_DA, KB_CLK into a pair of USB differential signals $D_2+$ and $D_2-$, and then sends the signal pair $D_2+$ and $D_2-$ to the computer 150 through the USB port 210. In the case of FIGS. 4A and 4B, the portable keyboard 200 further includes a PS/2 port 490 in order to support a computer with PS/2 interface. The PS/2 port 490 is used to pass the data signal KB_DA and the clock signal KB_CLK to the computer 150 when the route selection unit establishes the second route P2.

If the computer 150 is powered on and connected to the portable keyboard 200, as mentioned above, the portable keyboard 200 can source charge current from the computer 150 through the power line Vcc of the upstream port 324 so as to charge the hand-held electronic device 100 through the power line Vcc of the downstream port 322 by way of the second port 342. If the AC adapter 270 is plugged into the power port 280, the portable keyboard 200 can source charge current from the AC adapter 270. In a similar fashion, the charge current flows through the second port 342 to charge the hand-held electronic device 100 that is attached to the main connection port 220.

The keyboard controller 310 in the portable keyboard 200 of the invention preferably supports a power saving mode. If the keyboard controller 310 is idle for a while, it enters the power saving mode to reduce power consumption of the hand-held electronic device 100. If the portable keyboard 200 does not connect to the computer 150, the power source of the USB controller 320 is disconnected and all wires coupled to the keyboard controller 310 are also isolated. This results in more savings on energy use of the hand-held electronic device 100. Note that the keyboard controller 310 and the USB controller 320 may be integrated in a single IC chip. Furthermore, it is appreciated to those skilled in the art that the portable keyboard of the invention can synchronize the hand-held electronic device 100 with the computer 150 in a typical serial transmission manner if the hand-held device 100 does not support the USB interface.

Accordingly, the present invention discloses a portable keyboard fitting directly onto a hand-held electronic device and a computer. The portable keyboard of the invention provides recharging of the hand-held electronic device and synchronization of the hand-held electronic device with the computer. The portable keyboard employs a switch to selectively attach the portable keyboard to the hand-held electronic device or the computer for entering a large amount of data easily. Pushing a sync button on the portable keyboard, the information in the hand-held device is automatically synchronized with the computer. In addition, the portable keyboard may charge the hand-held electronic device through the connected computer or an external power source plugged into the keyboard.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. An input apparatus for a hand-held electronic device and a computer, comprising:
   a main connection port, for connecting to the hand-held electronic device;
   a communication port, for connecting to the computer;
   an input controller, for providing a plurality of serial input signals;
   a communication controller having a serial port coupled to the communication port, for receiving and converting the serial input signals into a set of differential signals transferred through the serial port; and
   a route selection unit establishing a first route between the input controller and the main connection port and establishing a second route between the input controller and the communication controller, for selectively transferring the serial input signals over one of the first and the second routes.

2. The input apparatus as recited in claim 1 wherein the serial port of the communication controller is an upstream port, in which the communication controller further comprises a downstream port.

3. The input apparatus as recited in claim 2 wherein the main connection port comprises a first port coupled to the route selection unit and a second port coupled to the downstream port.

4. The input apparatus as recited in claim 3 wherein the input apparatus is a keyboard, the input controller is a keyboard controller, and the serial input signals are keyboard signals.

5. The input apparatus as recited in claim 4 wherein the keyboard controller sends the keyboard signals to the hand-held electronic device over the first route through the first port when the route selection unit establishes the first route between the keyboard controller and the first port of the main connection port.

6. The input apparatus as recited in claim 5 wherein the communication controller is a universal serial bus (USB) controller supporting USB hub function and the communication port is a USB port.

7. The input apparatus as recited in claim 6 wherein the USB controller converts the keyboard signals, received from the second route, into the set of differential signals compliant with the USB specification and transfers the set of differential signals to the computer through the USB port when the route selection unit establishes the second route between the keyboard controller and the USB controller.

8. The input apparatus as recited in claim 7 wherein the USB controller synchronizes the hand-held electronic device with the computer in response to a sync enable signal in which data is sent/received through the downstream port by way of the second port to/from the hand-held electronic device and through the upstream port by way of the USB port to/from the computer.

9. The input apparatus as recited in claim 4 further comprising a PS/2 port for passing the keyboard signals to the computer when the route selection unit establishes the second route.

10. The input apparatus as recited in claim 3 wherein the second port passes charge current from the computer connected to the communication port to recharge the hand-held electronic device.

11. The input apparatus as recited in claim 3 further comprising a power port for connecting to an external power source which provides recharging of the hand-held electronic device through the second port.

12. The input apparatus as recited in claim 1 wherein the route selection unit is a mechanical switch.

13. The input apparatus as recited in claim 12 wherein the mechanical switch is set at a first state to selectively establish the first route and is set at a second state to selectively establish the second route.

14. The input apparatus as recited in claim 13 comprising a sync button for providing the sync enable signal.

15. The input apparatus as recited in claim 1 wherein the route selection unit is an electronic switch selectively establishing the first route and the second route in accordance with a select signal.

16. A portable keyboard for data entry comprising:
a main connection port having a first port and a second port, for connecting to a hand-held electronic device;
a universal serial bus (USB) port, for connecting to a computer;
a keyboard controller, for providing a data signal and a clock signal;
a USB controller supporting USB hub function, comprising a downstream port coupled to the second port and an upstream port coupled to the USB port, for converting the data signal and the clock signal into a pair of USB differential signals, compliant with the USB specification, transferred through the upstream port, and for synchronizing the hand-held electronic device with the computer in response to a sync enable signal in which data is sent/received through the downstream port by way of the second port to/from the hand-held electronic device and through the upstream port by way of the USB port to/from the computer; and
a route selection unit establishing a first route between the keyboard controller and the first port and establishing a second route between the keyboard controller and the USB controller, for selectively transferring the data and clock signals over the first route and the second route.

17. The portable keyboard as recited in claim 16 comprising a sync button for providing the sync enable signal.

18. The portable keyboard as recited in claim 16 further comprising a PS/2 port for passing the data and clock signals to the computer when the route selection unit establishes the second route.

19. The portable keyboard as recited in claim 16 wherein the second port of the main connection port passes charge current from the computer connected to the USB port to recharge the hand-held electronic device.

20. An input apparatus attached to an electronic device and a computer comprising:
a user control interface;
a main connection port having a first port, for attaching the electronic device;
a communication port, for connecting to the computer;
an input controller, for generating a user-input signal when the user control interface is operated;
a communication controller having an upstream port coupled to the communication port;
a first route electrically coupled between the input controller and the first port;
a second route electrically coupled between the input controller and the communication controller; and
a route selection unit, for selectively transferring
the user-input signal over the first route and the second route;
wherein the user-input signal is transferred through the first route to the first port when the route selection unit selects the first route;
wherein the user-input signal is transferred through the second route to the communication controller so as to output a corresponding transmission signal when the route selection unit selects the second route.

21. The input apparatus as recited in claim 20 further comprising a sync button, the main connection port further comprising a second port, and the communication controller further comprising a downstream port coupled to the second port, wherein the communication controller stops outputting the transmission signal and causes data transfer between the upstream port and the downstream port when the sync button is triggered, thereby providing synchronization of the electronic device with the computer.

22. The input apparatus as recited in claim 20 wherein the input apparatus is a keyboard, the user control interface is a keypad, and the input controller is a keyboard controller.

23. The input apparatus as recited in claim 20 wherein the communication controller is a universal serial bus (USB) controller.

* * * * *